E. W. McCARROLL.
ADJUSTABLE MIRROR ATTACHMENT.
APPLICATION FILED OCT. 16, 1919.

1,342,854.

Patented June 8, 1920.

WITNESSES
J. Herbert Bradley.
Francis J. Tomasson

INVENTOR
Edward W. McCarroll
by Christy & Christy
his attorneys

UNITED STATES PATENT OFFICE.

EDWARD W. McCARROLL, OF PITTSBURGH, PENNSYLVANIA.

ADJUSTABLE MIRROR ATTACHMENT.

1,342,854.   Specification of Letters Patent.   Patented June 8, 1920.

Application filed October 16, 1919. Serial No. 331,094.

*To all whom it may concern:*

Be it known that I, EDWARD W. MCCARROLL, residing at Pittsburgh, in the county of Allegheny and State of Pennsylvania, a citizen of the United States, have invented or discovered certain new and useful Improvements in Adjustable Mirror Attachments, of which improvements the following is a specification.

The object of my invention is to provide convenient means for attaching a mirror to an automobile and the like in such a manner that, when desired for use, the mirror may be supported in various positions to suit the convenience of those in the automobile, and that when not in use the mirror and its support will be in an inconspicuous position.

Figure 1:
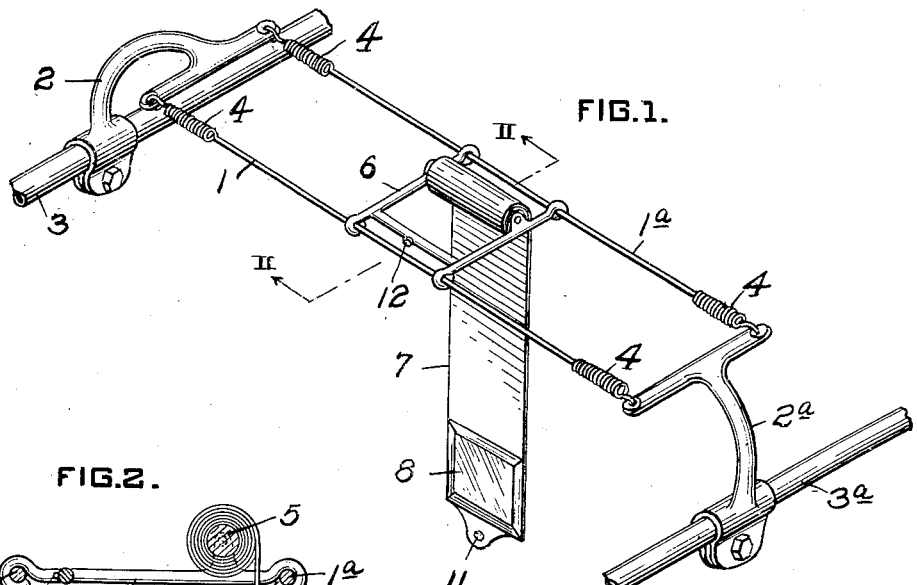
Figure 2:
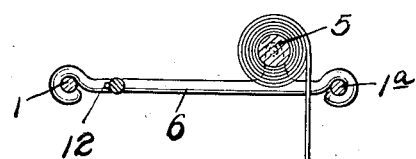
Figure 3:
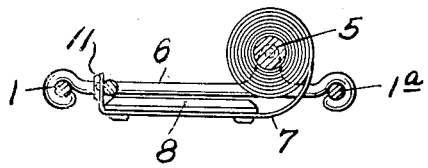

In the accompanying sheet of drawings, which form part of my specification, the preferred embodiment of my invention is illustrated. Figure 1 is a perspective view of the mirror attachment secured into the side rods of the top of an automobile the mirror being in a position for use; Fig. 2 a vertical sectional view taken on the line II—II, Fig. 1; Fig. 3 a view similar to Fig. 2 showing the position of the mirror when not in use; and Fig. 4 a perspective view of the mirror detached from its normal support.

The mirror attachment which I provide includes an elongate support adapted to be attached to the upper portion of an automobile and the like in a general horizontal position extending from one side to the other of the automobile, and upon such support there is mounted for movement longitudinally of the support a retracting member to which there is attached a mirror.

In the illustrative embodiment of the invention, the elongate support preferably consists of a track formed of two rods 1 and 1ª extending parallel to each other in a common horizontal plane and attached at their ends to brackets 2 and 2ª, which brackets in turn are adapted to be clamped to the side rods 3 and 3ª of a collapsible automobile top or hood. Preferably, springs 4 are arranged between the ends of the rods or tracks and the brackets to avoid rattling and to render a single support capable of being used on automobiles having different distances between the rods 3 and 3ª.

Figure 4:
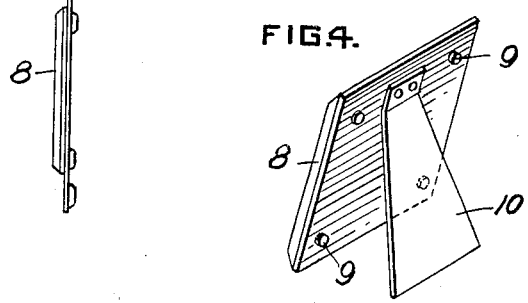

While various forms of retracting members may be used, that shown herein consists of a spring roller 5 of the type used for window shades and the like. This roller is attached preferably to a side of a frame 6 adapted to slide upon the track rods 1 and 1ª, and to the roller there is fastened a flexible strip 7 of fabric or other suitable material. It is to the lower end of the strip 7 that the mirror 8 is fastened. As indicated in Fig. 4, the back of the mirror is provided with button-head snaps 9, so that when desired the mirror may be detached from the strip 7 and be used as a hand mirror or stood upon a suitable support. For the latter use the back of the mirror may be provided with a pedestal 10.

As previously stated, the roller 5 is preferably attached to a side of the frame 6. By such arrangement the mirror may, when not in use, be held in an inconspicuous position adjacent to the frame. The end of the strip 7 may be provided with a fastener member 11 adapted to engage a coöperating member 12 on the frame 6 to hold the mirror in the position indicated in Fig. 3.

While the mirror attachment may be fastened in various positions to the top of an automobile, it may be conveniently so placed that when the mirror is drawn down to the position indicated in Fig. 1 it will be in front of the rear seat. The frame may at any time be moved along the track rods to place the mirror immediately in front of the person wanting to use it. When not in use, the mirror will, as previously stated, be in the inconspicuous position indicated in Fig. 3.

According to the provisions of the patent statutes, I have described the principle and operation of my invention together with the construction which I now consider to represent the best embodiment thereof. However, I desire to have it understood that, within the scope of the appended claims, my invention may be practised by other forms of construction than that specifically shown and described herein.

I claim as my invention:

1. A mirror attachment for automobiles and the like, including in combination an elongate support provided with means for attaching it in a substantially horizontal position to the top of an automobile, a retracting member attached at one end to said support for movement longitudinally thereof, and a mirror attached to the other end of said member.

2. A mirror attachment for automobiles and the like, including in combination a pair of clamps adapted to be attached one to each side of the top of an automobile, a track secured at its opposite ends to said clamps, a retracting member attached at one end to said track for movement thereon, and a mirror attached to the other end of said member.

3. A mirror attachment for automobiles and the like, including in combination an elongate support provided with means for attaching it in a substantially horizontal position to the top of an automobile, a retracting roller attached to said support for movement longitudinally thereof, and a flexible member having one end attached to said roller and provided at its other end with a mirror.

4. A mirror attachment for automobiles and the like, including in combination a pair of clamps adapted to be attached one to each side of the top of an automobile, two tracks extending parallel to each other in substantially a horizontal plane and having their ends attached to said clamps, a frame mounted for movement upon said tracks, a retracting member attached at one end to said frame, a mirror attached to the other end of said member, and means for holding said mirror adjacent to said frame when the mirror is not in use.

5. A mirror attachment for automobiles and the like, including in combination a pair of clamps adapted to be attached one to each side of the top of an automobile, two tracks extending parallel to each other in substantially a horizontal plane and having their ends attached to said clamps, a frame mounted for movement upon said tracks, a retracting roller attached to one side of said frame, a flexible member having one end attached to said roller, a mirror detachably connected to the other end of said flexible member, and means for holding said mirror adjacent to said frame when the mirror is not in use.

In testimony whereof I have hereunto set my hand.

EDWARD W. McCARROLL.

Witnesses:
 PAUL N. CRITCHLOW,
 FRANCIS J. TOMASSON.